United States Patent Office 3,096,848
Patented July 9, 1963

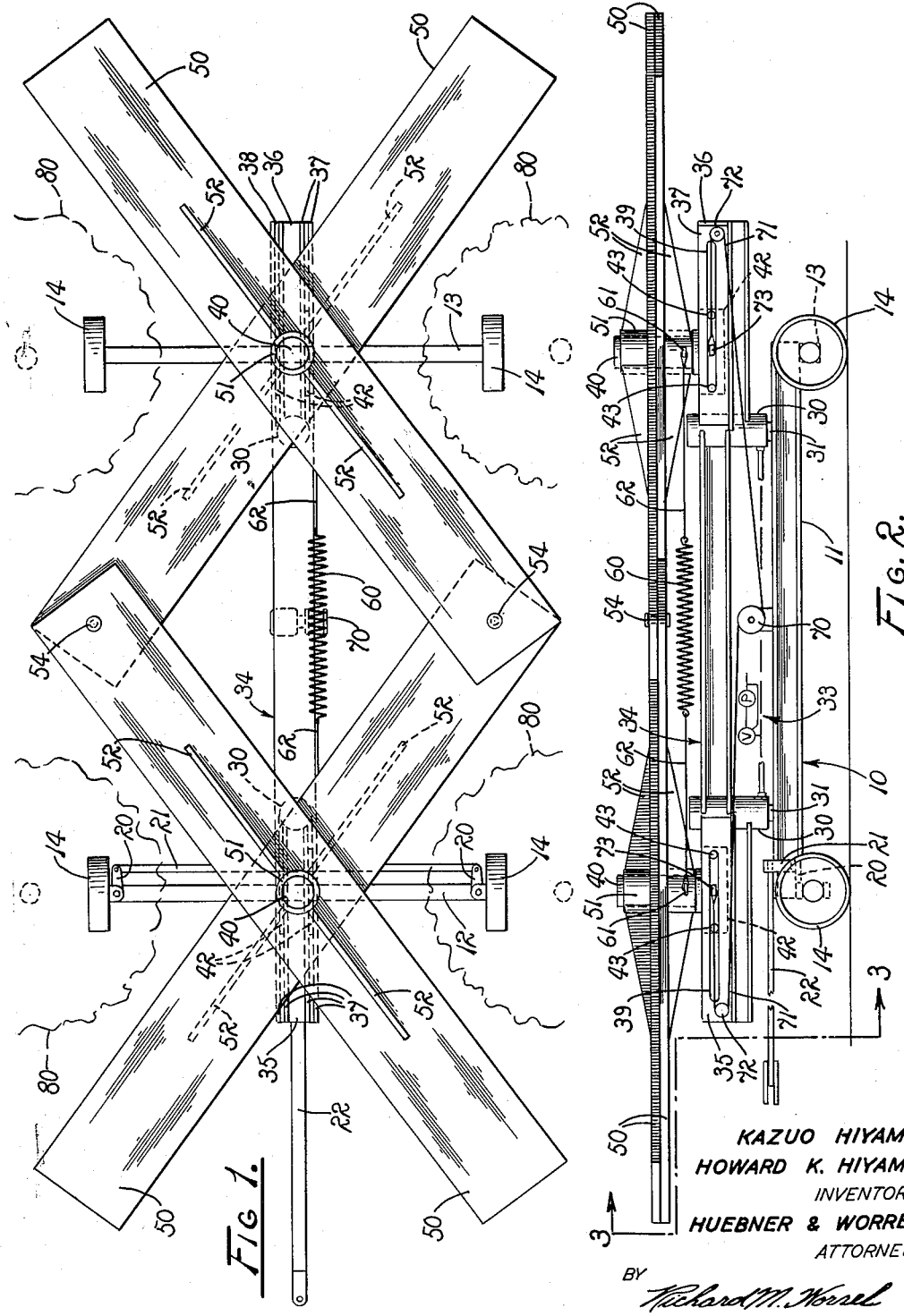

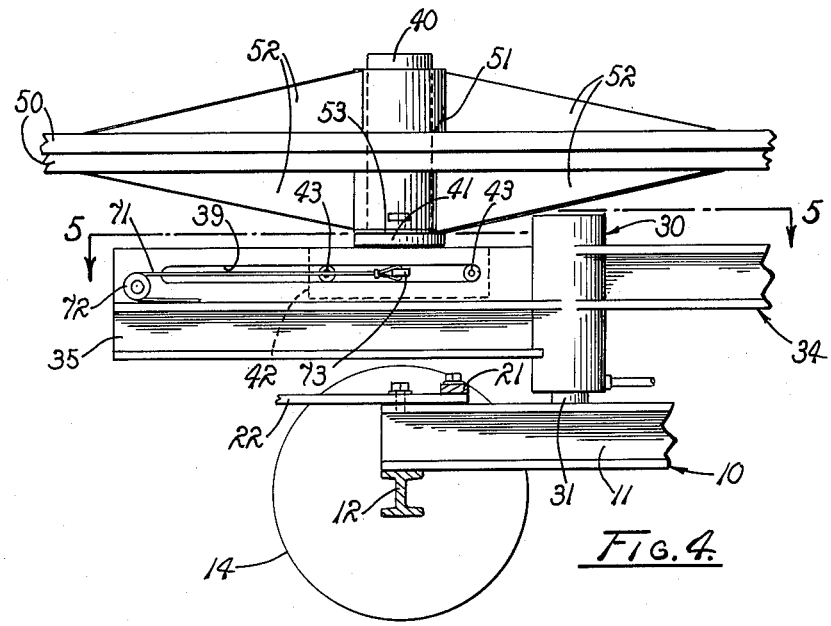

3,096,848
MOBILE EXTENSIBLE SCAFFOLD
Kazuo Hiyama and Howard K. Hiyama, both of
8184 E. Adams, Fowler, Calif.
Filed Sept. 8, 1961, Ser. No. 136,785
12 Claims. (Cl. 182—131)

The present invention relates to a folding scaffold for supporting one or more workmen at an elevated station adjacent to an upright object and more particularly to a laterally retractable mobile scaffold having a platform which is movable between a work position in an elevationally adjacent relation to one or more upright objects, such as spaced trees of an orchard, and a retracted position wherein the width of the platform is minimized to facilitate the movement of the scaffold around the between such objects.

The scaffold of the present invention was designed for use in the care and maintenance of orchards. However, the invention is adapted for use with many types of upright or tall objects and is not to be limited to orchard use although conveniently described in such connection.

In the past, it has been the conventional practice to use ladders to support workmen during the pruning, thinning and picking of orchard trees. Since the ladders must be of sufficient length to enable access to the top of the trees and such length renders them unwieldy, and the ladders must be positioned at various circumferential positions during tree maintenance operations, it will be appreciated that orchard maintenance with such equipment is time consuming. In addition, ladders are inherently unstable, particularly in view of the uneven, cultivated, and frequently obstructed supporting areas available in orchards, and a certain element of risk is involved with their use. Also, ladder use requires that the mature size of each tree be maintained at limited diametrical and vertical dimensions.

Accordingly, it is an object of the present invention to provide a mobile scaffold having a large retractable support platform which is stable.

Another object is to permit the growth of larger trees in an orchard and thereby to enhance the economic potential thereof by the provision of practical means for pruning, thinning and picking such trees.

Another object is to provide a retractable scaffold which can be readily moved between a retracted transport position and a laterally extended work position.

Another object is to provide a mobile, retractable scaffold for use in an orchard and which is adapted for earth traversing movement between a pair of adjacent rows of trees and being further adapted for extension into a working position to enable a workman to gain access to a plurality of trees in such rows.

Another object is to facilitate the care and maintenance of orchards, particularly the operations of thinning, pruning, and picking trees.

Another object is to provide a retractable mobile scaffold including a workman supporting platform for movement between a laterally extended work position and a retracted position having a minimum width to permit earth traversing movement in such retracted position.

Another object is to increase the safety of workmen engaged in the care and maintenance of orchards.

Another object is to provide a mobile scaffold having a laterally retractable platform which is elevationally adjustable as a unit.

A further object of the invention is to provide a mobile scaffold which can be readily adjusted to the height and lateral spacing of trees of a variety of orchards.

These, together with other objects, will become more fully apparent upon reference to the following description and accompanying drawings.

In the drawings:
FIG. 1 is a top plan view of a retractable scaffold embodying the principles of the present invention.
FIG. 2 is a slide elevation of the scaffold of FIG. 1.
FIG. 3 is a front elevation of the scaffold of FIG. 2.
FIG. 4 is a fragmentary view of the front end of the scaffold of FIG. 2, a portion being in longitudinal vertical section.
FIG. 5 is a fragmentary view in longitudinal horizontal section taken on line 5—5 of FIG. 4.

As shown in FIGURES 1 and 2, the scaffold of the present invention is provided with a mobile frame 10 including a base 11 supported on longitudinally spaced front and rear axles 12 and 13. Each axle rotatably mounts a pair of opposed wheels 14. Both of the wheels of the front axle are provided with steering arms 20 interconnected by a suitable drag link 21. Pivotally supported on the front axle and operatively connected to the drag link is a draft member 22 adapted for connection to a tractor, or other prime mover, not shown. The scaffold may also be self-propelled; however, to reduce the weight of the scaffold to a minimum and to improve its mobility, the frame preferably takes the form of a trailing vehicle.

Rigidly secured to the base 11 are longitudinally opposed piston cylinder assemblies 30. Each piston-cylinder assembly includes a central rod 31 anchored to the base 11. The inner contstruction of each assembly is shown more clearly in FIGURES 4 and 5, wherein the central rod is encircled by a plurality of concentric, telescopic members 31. The concentric members are adapted for selective extension through the medium of fluid pressure in a conventional manner. A pump and valve arrangement is schematically indicated at 33 as a source of fluid pressure and control therefore to effect the extention and retraction of the piston-cylinder assemblies. Each assembly may be provided with individual sources of fluid pressure, but a common source with suitable pressure and return fluid conduits is preferred to effect synchronized movement of the assemblies.

The upper portions of the piston-cylinder assemblies carry a longitudinally extended auxiliary frame 34. The auxiliary frame includes fore and aft portions 35 and 36, each of which is provided with a plurality of laterally spaced upstanding stabilizing members 37. The upstanding members define spaced longitudinally extended, vertical slots 38, and each of these members is provided with transversely aligned, longitudinally extended, horizontal slots 39.

A pair of longitudinally spaced king bolts 40 is longitudinally slidably mounted on the auxiliary frame 34 by means of respective bases 41 which include a plurality of depending supports 42 received in the slot 38 and interfitting with the stabilizing members 37. A pair of transversely extended pins 43 secured to the depending supports 42 and slidably received in each of the slots 39 complete sliding connections between the king bolts 40 and the auxiliary frame 34.

A workmen supporting platform is formed by four longitudinally extended substantially coplanar platform sections 50. Intermediate its respective ends, each section is provided with a bearing portion 51 and a truss portion 52 secured thereto. The trusses impart a maximum rigidity to each section, while minimizing the respective weight thereof. The bearing portion 51 of each platform is provided with a vertical bore in which is received the respective king bolt. The lower portion of the bearing of the lowermost platforms terminates in a thrust collar 53 which bears against the base 41 of its respective king bolt.

As can be seen in FIGURES 1 and 2, each pair of platform sections 50 is rotatably carried on its respective king bolt 40, and is movable between an extended work position shown in FIGURE 1 and a retracted transport position. In the latter, the lateral dimensions of the scaffold are reduced by folding the sections toward each other until the upper section of each pair substantially overlies the lower section. To insure a synchronized extension and retraction, the adjacent ends of each pair of platform sections are joined by pivotal connections indicated at 54. When so joined, the platforms may be considered a pair of interconnected toggle linkages.

It can also be seen in FIGURES 1 and 2 that the longitudinal positions of the king bolts 40 are changed relative to each other during the extension and retraction of the platform sections. As shown in an extended condition, the king bolts have moved toward each other to the innermost limits of their respective ranges of movement wherein the adjacent pins 43 abut the innermost limits of the slots 39. Conversely, as the platform sections are retracted, the king bolts are moved away from each other. Accordingly, the range of movement of the king bolts is determined by the degree of extension and retraction desired, and the length of the slot 39 is selected to accommodate such range of movement.

To assist in moving the platform sections 50 to an extended position and to maintain them in such a condition, a biasing spring 60 is connected between the king bolts 40. The connection so formed includes lugs 61 secured to the lowermost platform section of each pair, and the lugs are connected to the spring by means of tension members 62.

A winch 70, including a motor which may be motivated by any suitable source of power, not shown, is used to wind in a cable 71 trained over opposed idler sheaves 72 and secured to ears 73 carried by each king bolt. In this manner, the king bolts are controllably urged away from each other to determine the degree of retraction of the platform sections.

*Operation*

The operation of the described embodiment of the subject invention is believed to be readily apparent and is briefly summarized at this point. As stated above, the scaffold is conveniently described in connection with the care and maintenance of an orchard. For this purpose, trees 80 are used to indicate portions of longitudinally extended, laterally spaced rows of trees in an orchard.

During the fruit growing season, it is necessary to prune and to thin the trees and ultimately to pick the mature fruit. During such operations, the scaffold is drawn between two adjacent rows of trees, as shown in FIGURE 1. Release of the cable winding winch 70 permits the spring 60 to draw the king bolts 40 toward each other and thereby to extend the platform sections 50. The degree of extension can be determined by the length of cable unwound from the winch, and accordingly, trees of varying diametrical dimensions can be accommodated.

After the platform sections have been extended to a desired position, the auxiliary frame 34 along with the entire platform formed by the extended sections 50 may be elevationally adjusted by extending the piston-cylinder assemblies 30. This elevational adjustment is effected by appropriately positioning the valve and operating the pump of the arrangement 30 schematically illustrated in FIG. 2.

By so adjusting the platform both elevationally and laterally, trees of varying sizes and spacings can be efficiently attended throughout the growing and dormant seasons. Since it is a current practice to maintain orchard trees at a restricted size consistent with profitable operations so that equipment now available can be safely used, the scaffold of the present invention permits the vertical and diametrical dimensions of the trees to be increased without endangering the safety of the workmen performing the care and maintenance of the trees or interfering with the efficiency of the work performed on the trees.

After each set of four trees has been attended, the platform sections are folded to a transport position, and the scaffold is then drawn to the next set of trees. If variances occur in the relative heights of the trees being attended, the scaffold is elevationally adjusted by means of the piston-cylinder assemblies 30. Also, as the platforms are extended with each set of trees, the degree of extension is varied in accordance with their diametrical dimensions. Accordingly, it can be seen that a mobile scaffold has been provided which permits the growth of orchard trees of maximum dimensions, thereby enhancing the economy of orchards. Also, a stable and safe scaffold is provided which can accommodate trees of various sizes and shapes which normally occur in such orchards.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described our invention, what we claim as new and desire to secure by Letters Patent is:

1. A scaffold comprising an elongated mobile frame; at least two pairs of platforms; pivot members interconnecting said platforms; each of said pairs comprising two separate horizontally disposed plane platform members pivotally interconnected; and means mounting said pairs on the frame to permit displacement of said pivot members toward and away from each other in a direction parallel to the plane members whereby the scaffold is selectively extended longitudinally and laterally of said frame.

2. A scaffold comprising an elongated mobile frame; four horizontally disposed elongated platforms; pivot joints providing separate pivotal interconnections between said platforms to form a pair of toggle linkages, two of said pivot joints serving as the respective knees of the linkages; and means mounting said pivot joints on said frame, including means to permit movement of said knees toward and away from each other to effect the lateral extension and retraction of said platforms.

3. A mobile scaffold comprising a base mounted for earth traversing movement; a pair of spaced horizontally disposed extensible platforms, each pair comprising two elongated planar sections having opposite ends, said sections being pivotally interconnected by a knee at a point intermediate their respective ends; each of said pairs of spaced platforms presenting a pair of ends adjacent to the other of said pair; means pivotally interconnecting the adjacent ends of said pair of platforms to form a toggle linkage; and means mounting said platforms on said base, including means for moving said knees toward and away from each other to effect extension and retraction of said platforms.

4. A scaffold comprising a longitudinally extended base; a plurality of longitudinally spaced piston-cylinder assemblies secured to the base and adapted for extension and retraction in a vertical plane; controlled means for extending and retracting said assemblies; an auxiliary frame mounted on said piston-cylinder assemblies; a pair of longitudinally spaced horizontally disposed laterally folding platforms mounted on said frame, each pair comprising two separate elongated sections of predetermined lengths defined by end portions, said sections being pivotally interconnected at a point intermediate their respective end portions for movement between a laterally retracted position wherein one of said sections of each pair substantially overlies the other section and an extended position wherein the end portions of the respective sections of each pair are spaced in a substantially common horizontal plane; pivot pins connecting the adjacent end portions of said spaced pair of platforms; and means to move said pivot pins toward and away from each other to effect retraction and extension of said platforms.

5. A scaffold comprising a mobile, longitudinally extending base; a pair of longitudinally spaced piston-cylinder assemblies mounted on the base and adapted for extension and retraction in a vertical plane; power means for effecting such extension and retraction; an auxiliary frame carried on said assemblies, said frame having longitudinally spaced end portions provided with stabilizing means; a pair of longitudinally spaced king bolts; means slidably connecting said king bolts to said stabilizing means; a pair of longitudinally spaced horizontally disposed laterally folding platforms mounted on said frame, each pair comprising two separate elongated sections of predetermined lengths defined by end portions, said sections being pivotally interconnected at a point intermediate their respective end portions for movement between a laterally retracted position wherein one of said sections of each pair substantially overlies the other section and an extended position wherein the end portions of the respective sections of each pair are spaced in a substantially common horizontal plane; pivot pins connecting the adjacent end portions of said spaced pairs of platforms; and means to move said king bolts toward and away from each other to effect retraction and extension of said platforms.

6. A scaffold comprising an elongated base; a frame mounted on said base; a pair of longitudinally spaced horizontally disposed laterally folding platforms mounted on said frame, each pair comprising two separate elongated sections of predetermined lengths defined by end portions, said sections being pivotally interconnected at a point intermediate their respective end portions for movement between a laterally retracted position wherein one of said sections of each pair substantially overlies the other section and an extended position wherein the end portions of the respective sections of each pair are spaced in a substantially common horizontal plane; pivot pins connecting the adjacent end portions of said spaced pair of platforms; and means to effect retraction and extension of said platforms.

7. A scaffold comprising a base; an auxiliary frame carried on said base, said frame having longitudinally spaced end portions provided with stabilizing means; a pair of king bolts spaced longitudinally of the base; means slidably connecting said king bolts to said stabilizing means; a pair of longitudinally spaced horizontally disposed laterally folding platforms mounted on said frame, each pair comprising two separate elongated sections of predetermined lengths defined by end portions, said sections being pivotally interconnected at a point intermediate their respective end portions for movement between a laterally retracted position wherein one of said sections of each pair substantially overlies the other section and an extended position wherein the end portions of the respective sections of each pair are spaced in a substantially common horizontal plane; pivot pins connecting the adjacent end portions of said spaced pairs of platforms, and means to move said king bolts toward and away from each other to effect retraction and extension of said platforms.

8. A scaffold comprising a frame, a pair of first pivot members mounted in the frame in substantially erect positions, a pair of substantially horizontal platforms pivotally mounted on each pivot member, the platforms of the opposite pivot members having adjacent ends, and further pivot members individually pivotally connecting said adjacent ends of one pair of platforms to the adjacent ends of the opposite pair of platforms, the pivot members accommodating opposite lateral movement of the platforms incident to ther pivotal movement and the resultant decrease in effective reach of the platforms between said first pivot members.

9. A scaffold comprising a mobile frame, a pair of pivot members mounted in the frame in substantially erect positions for relative movement toward and from each other in substantial parallelism, a pair of substantially horizontal platforms pivotally mounted on each pivot member, the platforms of the opposite pivot members having adjacent ends, and means individually pivotally connecting each platform of one pair to an adjacent end of a platform of the opposite pair.

10. A scaffold comprising a mobile frame, at least two pairs of elongated platform members, means pivotally interconnecting the platforms of each pair for pivotal movement about substantially erect axes in spaced relation to corresponding ends of said platforms, said corresponding end of each platform of one pair thereof posed toward each other, means pivotally connecting a corresponding end of each platform of one pair thereof individually with a corresponding end of a platform of the other pair for relative movement about a substantially erect axis, and means mounting the means pivotally interconnecting the platforms of each pair on the frame for relative movement toward and from each other to permit corresponding displacement of their erect axes incident to pivotal movement of the interconnected platforms.

11. A scaffold comprising a mobile frame, at least two pairs of elongated platform members, means pivotally interconnecting the platforms of each pair for pivotal movement about substantially erect axes intermediate opposite ends of the platforms, the platforms of the pairs thereof having adjacent ends, means pivotally connecting an end of each platform of one pair individually with an adjacent end of a platform of the other pair for relative movement about a substantially erect axis, and means mounting the means pivotally interconnecting the platforms of each pair on the frame for relative movement toward and from each to permit corresponding displacement of their erect axes to pivotal movement of the interconnected platforms.

12. The scaffold of claim 9 including resilient means connected to the pivot members urging said members toward each other.

References Cited in the file of this patent

UNITED STATES PATENTS

| | | |
|---|---|---|
| 803,717 | Schwarz et al. | Nov. 7, 1905 |
| 2,753,224 | Troche et al. | July 3, 1956 |
| 3,016,989 | Lindmark | Jan. 16, 1962 |